(12) United States Patent
Hirao et al.

(10) Patent No.: US 9,193,116 B2
(45) Date of Patent: Nov. 24, 2015

(54) METHOD OF MANUFACTURING HYBRID LENS UNIT

(75) Inventors: Tomomi Hirao, Chiba (JP); Ryosuke Niwaki, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 66 days.

(21) Appl. No.: 13/641,828

(22) PCT Filed: Aug. 6, 2012

(86) PCT No.: PCT/JP2012/069964
§ 371 (c)(1),
(2), (4) Date: Oct. 17, 2012

(87) PCT Pub. No.: WO2013/024733
PCT Pub. Date: Feb. 21, 2013

(65) Prior Publication Data
US 2014/0159260 A1    Jun. 12, 2014

(30) Foreign Application Priority Data

Aug. 12, 2011  (JP) .................................. 2011-176470

(51) Int. Cl.
*B29D 11/00* (2006.01)
(52) U.S. Cl.
CPC .... *B29D 11/00009* (2013.01); *B29D 11/00403* (2013.01); *B29D 11/00442* (2013.01)
(58) Field of Classification Search
None
See application file for complete search history.

(56) References Cited

U.S. PATENT DOCUMENTS

| | | | |
|---|---|---|---|
| 2001/0033360 A1* | 10/2001 | Koizumi et al. | ............... 351/159 |
| 2005/0174643 A1 | 8/2005 | Lee et al. | |
| 2006/0262416 A1 | 11/2006 | Lee et al. | |
| 2009/0279188 A1 | 11/2009 | Do | |
| 2011/0074055 A1 | 3/2011 | Nakahashi et al. | |
| 2012/0177819 A1* | 7/2012 | Lee et al. | ...................... 427/164 |

FOREIGN PATENT DOCUMENTS

| | | |
|---|---|---|
| CN | 102029722 A | 4/2011 |
| JP | 9-71439 A | 3/1997 |
| JP | 2005-227785 A | 8/2005 |
| JP | 2006-323365 A | 11/2006 |
| JP | 2009-222732 A | 10/2009 |
| JP | 2010-150489 A | 7/2010 |
| JP | 2011-28830 A | 2/2011 |
| JP | 2011-73300 A | 4/2011 |

OTHER PUBLICATIONS

International Search Report for PCT/JP2012/069964 dated Oct. 23, 2012.

* cited by examiner

*Primary Examiner* — Barbara J Musser
(74) *Attorney, Agent, or Firm* — Kenealy Vaidya LLP

(57) ABSTRACT

[Problem] To propose a hybrid lens unit comprising a hybrid lens and a guide component which can be manufactured with a low cost and a method thereof.
[Means for Solving the Problems] A method of manufacturing a hybrid lens unit includes the following steps of; (a) preparing a guide component having a through hole, and a plane parallel glass plate formed of optical glass; (b) fixing the plane parallel glass plate to at least one of surface of the guide component so that the plane parallel glass plate is accommodated in the guide component; and then (c) forming a resin lens on at least one of surfaces of the plane parallel glass plate by applying and curing energy-curable resin.

6 Claims, 10 Drawing Sheets

FIG. 14A

| SURFACE NUMBER | CORRESPONDING SURFACE | CURVATURE RADIUS | SURFACE SPACING | REFRACTIVE INDEX | ABBE NUMBER |
|---|---|---|---|---|---|
| 1 | S1 | ∞ | −0.0105 | | |
| 2 | S2 | 0.968 | 0.1 | 1.526 | 54 |
| 3 | S3 | ∞ | 0 | | |
| 4 | S4 | ∞ | 0.7 | 1.5168 | 64.17 |
| 5 | S5 | ∞ | 0 | | |
| 6 | S6 | ∞ | 0.1 | 1.526 | 54 |
| 7 | S7 | −0.92 | 0.72 | | |
| FOCAL PLANE | S8 | ∞ | | | |

FIG. 14B

| | SECOND SURFACE | SEVENTH SURFACE |
|---|---|---|
| k | 0 | −1.0 |
| $A_0$ | 0.064216 | 0.35705 |
| $B_0$ | 1.62E+01 | −7.69E+00 |
| $C_0$ | 4.62E+02 | 8.01E+01 |
| $D_0$ | 1.62E+03 | −2.24E+02 |

METHOD OF MANUFACTURING HYBRID LENS UNIT

TECHNICAL FIELD

The present invention relates to a method of manufacturing a hybrid lens that uses optical glass and resin and that can be easily manufactured with a low cost.

BACKGROUND ART

A hybrid lens, in which a thin aspherical resin layer is formed on a curved surface of a spherical glass lens, has been used in a situation with the need of a complicated aspherical shape, a large-diameter lens, or an aspherical meniscus lens, which is difficult to be formed of a glass lens.

In general, a glass lens has high environmental capability, and hence the glass lens less deteriorates in optical performance over the temperature, humidity, ultraviolet rays, etc., as compared with a resin lens. However, if the aspherical lens is manufactured with glass as described above, the glass has many limitations upon manufacturing. Owing to this, a hybrid lens using a spherical glass lens, which is relatively easily manufactured, is widely used.

As described above, the hybrid lens is used instead of the aspherical glass lens. Patent Literature 1 discloses an imaging hybrid lens as an example of positively employing the hybrid lens to address the problem of heat resistance. The imaging hybrid lens can resist a reflow step with lead-free solder when the imaging hybrid lens is mounted on an electronic component. The hybrid lens is a glass-resin hybrid lens formed of optical glass and energy-curable resin having a high heat resistance.

Also, Patent Literature 2 discloses a method of manufacturing a hybrid lens with a low cost by forming many resin-layer lens surfaces collectively on a plane parallel glass wafer with a size of several inches, then bonding the wafer with a sensor wafer, then cutting the wafers, and providing camera modules. Such a camera module is called wafer-scale camera module. Also, such a lens manufactured as described above is called wafer-scale lens.

CITATION LIST

Patent Literature

Patent Literature 1: Japanese Patent No. 3926380
Patent Literature 2: Japanese Unexamined Patent Application Publication No. 2006-323365

SUMMARY OF THE INVENTION

Technical Problem

As described above, the hybrid lens is gradually widely used in a situation with a difficulty in application of a resin lens, for example, when being subjected to reflow soldering, by combining the glass lens with the energy-curable resin having a high heat resistance, in addition to environmental stability. Since the hybrid lens uses the spherical glass lens, the hybrid lens is less expensive than an aspherical glass mold lens; however, the hybrid lens is much more expensive than a thermoplastic resin lens that is formed by injection molding.

Also, in order to manufacture a hybrid lens with a low cost, an individual plane parallel glass plate formed in a columnar shape may be used. In this case, the outer diameter portion of the columnar glass serves as a reference for a coaxial state of the lens. If the lens is assembled with an elastic member or the like called lens barrel that shields light other than light intended by the design to form a lens unit, since the outer diameter portion serves as the reference, a strict dimensional precision and a strict roundness are required. Even in this case, if the columnar plane glass is used, the hybrid lens can be manufactured with a low cost as compared with a situation in which a spherical glass lens is used. However, the hybrid lens is still more expensive than the resin lens.

Also, a wafer-scale lens is suggested as a method of manufacturing many hybrid lenses with a low cost. A large quantity of resin lenses are formed on a glass wafer with a size of several inches, and then individual hybrid lenses can be manufactured by dicing or the like. This method can manufacture a large quantity of hybrid lenses by few steps, and hence lenses can be provided with a markedly low cost. However, the cut lenses each have a rectangular shape. Easiness of assembly and precision of assembly become worse than those of a lens having a circular external shape when the lens is assembled with the lens barrel or the like. Further, a cutting dimensional error as the result of dicing is from about 0.05 to 0.1 mm, the value which is about five to ten times larger than 0.01 mm that is the precision of a dimensional error, the precision which is typically required for an optical lens. If a precise optical lens unit is required, precise positioning adjustment, such as X-Y position control through image processing or axis-alignment joining, has to be performed during the assembly. Thus, regarding the lens unit, an adjustment step with a high cost is required, and the provided lens becomes expensive.

Further, since the resin lenses are collectively formed on the plane parallel glass plate with the size of several inches, the glass wafer may be warped or cracked when the resin is cured and contracted during the lens formation. To restrict the warp and crack, the glass wafer has to be thick. Thus, the lenses have limitations for the lens design, and designed performance may deteriorate.

The present invention is made to solve such problems, and it is an object of the present invention to manufacture a hybrid lens with a low cost, in which a coaxial state of the lens can be highly precisely controlled, assembly precision during assembly is high, and only few limitations are present for lens design.

Solution to Problem

To address the above-described problems, according to an aspect of the present invention, there is provided a method of manufacturing a hybrid lens unit comprising a hybrid lens and a guide component, the method comprises the following steps of:

(a) preparing a guide component having a through hole, and a plane parallel glass plate formed of optical glass;

(b) fixing the plane parallel glass plate to at least one of surface of the guide component so that the plane parallel glass plate is accommodated in the guide component; and then (c) forming a resin lens on at least one of surfaces of the plane parallel glass plate by applying and curing energy-curable resin.

The guide component may be fabricated by a method that provides inexpensive high-precision components by a large quantity, for example, by metal cutting, injection molding with plastic, etching a metal plate, or punching a plastic plate or a metal plate. With this method, the precision of the outer diameter can be controlled so that a dimensional error is in a range from about 0.001 to 0.01 mm. In the aspect of the present invention, the high-precision guide component fabricated by this method is used to manufacture the hybrid lens unit.

Since the manufacturing method according to the aspect of the present invention is performed by using such a guide component, the outer diameter portion of the guide component can be used as the reference for the coaxial state of the lens. The precision of the coaxial state with respect to the outer diameter portion of the resin lens does not depend on the shape of the plane parallel glass plate, and the precision of the dimensional error can be restricted to be about 0.01 mm. Also, even if this hybrid lens is assembled with the lens barrel, the outer diameter portion of the guide component can be used as the reference for the coaxial state during assembly. The lens can be highly precisely assembled with a coaxial error of about 0.01 mm regardless of the shape of the plane parallel glass plate.

Also, the guide component can also serve as a lens edge portion in addition to the lens outer diameter portion. Hence, the size of the plane parallel glass plate may be desirably determined as long as a ray that is required in view of optical design can pass through the plane parallel glass plate. The size of the glass can be reduced, and the member cost can be reduced. Also, the hybrid lens using an individual piece of glass is hardly affected by breakage and warp of glass as compared with a wafer-scale lens, and hence a thin piece of glass can be used. With the hybrid lens using the manufacturing method according to the aspect of the present invention, the size of the glass can be further reduced by the reason described above. Even if the thin piece of glass is used, the warp and breakage of the glass due to contraction of curable resin can be prevented.

A lens unit, which is typically commercially available, is constituted by fixing at least one lens in a component that is formed of an elastic member called lens barrel that shields a ray other than a design ray required in view of optical design. In some cases, a unit constituted by a plurality of lenses uses an elastic member called spacer that controls a gap between lenses, in addition to the lens barrel. The method of fixing the lens to the lens barrel may be press fitting, bonding, welding, heat caulking, or a method of capping the lens barrel with an elastic member called lens retainer having a hole at the center. The method the most easily providing the highest precision from among these methods is press fitting. However, a fitting stress may be applied to the lens, briefringence or the like may occur, and the lens performance may frequently deteriorate. In contrast, since the lens edge portion of the hybrid lens unit that can be manufactured by the aspect of the present invention is provided by the guide component, a stress, which may be generated after press fitting to the lens barrel, is not applied to the plane parallel glass plate or the resin lens during assembly with the lens barrel. Even if the thin piece of glass is used, the glass is not broken. Further, since the outer diameter portion is press-fitted to the lens barrel, a fitting stress is not applied to the plane parallel glass plate or the energy-curable resin. Briefringence, which may degrade the optical performance, is not generated at the glass or the resin.

Also, with the manufacturing method according to the aspect of the present invention, the external shape and the external dimensions of the plane parallel glass plate may be desirably determined as long as the ray required in view of the optical design can pass through the plane parallel glass plate and the plane parallel glass plate is smaller than the outer diameter of the guide component. Hence, a scrap of glass, which is normally discarded after glass dicing, can be used for manufacturing the hybrid lens if the scrap of glass has a predetermined size or larger. Also, even if the glass edge portion is chipped, as long as the chipping does not reach the inside of the predetermined size, the chipped glass can be used for manufacturing the hybrid lens without any problem. Further, even if the glass is cut obliquely during dicing, the obliquely cut glass can be used as long as the glass has the predetermined size or larger. Thus, glass, which has been discarded because the glass has insufficient dimensions or shape, can be used. It is almost not necessary to care about glass loss. Further, the dimensional tolerance can be markedly eased. A plane parallel glass plate manufactured through a high-speed cutting step in an inexpensive manufacturing facility can be used instead of using a high-precision dicing facility that can achieve the dimensional precision such that a dimensional error is about 0.05 mm. A hybrid lens can be manufactured with a low cost.

The energy-curable resin used here is a material, the cross-linking reaction or polymerizing reaction of which progresses when the material receives external energy. The external energy may be, for example, heat, an ultraviolet ray, or an electron beam. The type of such an energy-curable resin may be thermosetting type, UV-curable type, or electron-curable type depending on the energy type. The type of the material may be typically silicone-based type, epoxy-based type, or acryl-based type. There are various types of the energy-curable resin as mentioned above; however, any energy-curable resin may be used as a resin lens material in the aspect of the present invention as long as the resin is sufficiently optically transparent. The limitation of being transparent represents that the material exhibits a small optical absorption and a small scattering by certain degree to be used within a predetermined wavelength range.

Also, the guide component may be formed of an elastic member having light-shielding performances such that a transparency is 1% or less and a surface reflectivity is 5% or less for a ray with a predetermined wavelength.

Since the member with the light-shielding performances is used as the guide component, light-shield processing such as preparing an additional light-shielding component or painting with black is not required, and the number of components can be reduced.

The light-shielding member may be, for example, thermoplastic resin or energy-curable resin to which a pigment such as a carbon black or a dye is added. Also, a metal material hardly transmits a ray; however, since the metal material has high reflection at the member surface, the member surface may be coated with black anodized aluminum or treated with blackening for delustering, so that the surface reflection can be reduced.

Also, at least one of the surfaces of the plane parallel glass plate may be treated with coating processing so that the transparency is 20% or less for the ray with the predetermined wavelength.

Since the coating processing is previously applied to the glass member that is used for the hybrid lens as described above, a filter for cutting the ray with the predetermined wavelength does not have to be additionally prepared. The number of components can be reduced, and the hybrid lens can be provided with a low cost.

A charge-coupled device (CCD) image sensor or a complementary metal oxide semiconductor (CMOS) image sensor has sensitivity in a range other than a visible light range. If an infrared ray is directly incident on the image sensor, it is known that the image quality deteriorates. Hence, to cut the not-required infrared ray, an infrared cut filter is inserted into a lens unit. According to the aspect of the present invention, since the film that cuts the infrared ray can be evaporated on one of the surfaces of the plane parallel glass plate that is used for the hybrid lens, the infrared cut filter does not have to be additionally prepared. Also, in case of application using the infrared ray, the hybrid lens may be manufactured by using a plane parallel glass plate on which a film is evaporated for cutting not-required visible light. In the evaporating step, evaporating is performed on a large piece of glass before the glass is cut into individual pieces, and then the glass is cut through a dicing process or the like, thereby obtaining glass pieces coated with the evaporated film, efficiently with a low cost. Since the filter is omitted, a lens unit can be provided with a low cost.

At least one of the surfaces of the plane parallel glass plate may be treated with antireflection processing so that the transparency is 80% or more for the ray with the predetermined wavelength used by the lens unit.

It is known that in a transparent solid, reflection occurs at interfaces between the air and the solid due to a refractive index specific to the material. For example, in a case of a glass member with a refractive index of 1.5, light is reflected by about 4% from among rays that are orthogonally incident on the glass member. When many interfaces of the air and the solid are present, reflection occurs by the number of interfaces, and the quantity of light is reduced. Further, in the imaging lens unit, if reflection light is incident on the image sensor, it is known that a defective phenomenon, which degrades the image quality, such as a flare or a ghost, may occur. If not-condensed light is incident on the image sensor due to multiple reflection, the quantity of noise of the image sensor is increased, and the contrast of the image is decreased. This is a defective phenomenon called flare. Also, if reflection light is condensed and forms an image, vivid light dots or lines may be visually recognized. This is a defective phenomenon called ghost. According to the aspect of the present invention, since the antireflection film can be easily formed on the plane parallel glass plate, the problems caused by the reflection at the glass surface can be addressed with a low cost.

Further, when the hybrid lens is manufactured, the reflectivity is increased in proportion to the difference between the refractive indices of the glass and the resin. If the reflectivity is increased, the above-described flare or ghost is generated. According to the aspect of the present invention, since the antireflection structure can be provided on the surface of the plane parallel glass plate, as long as the antireflection film corresponding to the refractive indices of the resin and the glass is formed, the reflection light can be restricted even if the difference between the refractive indices of the resin and the glass is large. The film can be formed on a large piece of glass as described above in the description of the infrared cut film, the hybrid lens unit with the antireflection function can be provided with a low cost.

The resin lens may preferably have a curved surface having an aspherical surface shape.

To enhance the lens performance with a small number of lenses, it is very effective that the curved surface is aspherical. According to the aspect of the present invention, when the resin lens is formed, the surface of the resin layer adjacent to the air may be aspherical, like a conventional hybrid lens. Since the number of lenses is reduced, the hybrid lens unit can be provided with a low cost.

Further, refractive indices and Abbe numbers of the plane parallel glass plate and the energy-curable resin may preferably satisfy Expressions (1) and (2) as follows:

[Math. 1]

$$0 \le |Ng - Nr| \le 0.1 \quad (1), \text{ and}$$

$$0 \le |vg - vr| \le 30 \quad (2),$$

where Ng is a refractive index based on the d-line of the plane parallel glass plate for the ray with the predetermined wavelength, Nr is a refractive index based on the d-line of the energy-curable resin for the ray with the predetermined wavelength, vg is an Abbe number based on the d-line of the plane parallel glass plate, and vr is an Abbe number based on the d-line of the energy-curable resin.

As long as the above-described conditions are satisfied, the flare or ghost can be restricted even if the antireflection processing is not provided at the interfaces between the glass and the resin.

Advantageous Effects of Invention

As described above, with the manufacturing method suggested by the aspect of the present invention, the hybrid lens unit can be manufactured with good assembly precision, with a low cost, in which the coaxial state of the hybrid lens using the glass and the resin can be highly precisely controlled regardless of the dimensions and precision of the plane parallel glass plate. Further, since the number of components can be reduced and the thin piece of glass can be used, the hybrid lens unit that has the reduced limitations for design, is high in quality, is low in cost, and is high in precision, can be provided.

BRIEF DESCRIPTION OF DRAWINGS

FIG. 14A A table showing design data of an example of a hybrid lens unit.

FIG. 14B A table showing design data of an example of a hybrid lens unit.

DESCRIPTION OF EMBODIMENTS

Embodiments of the present invention are described below with reference to the drawings. The drawings illustrate constitution examples according to the embodiments of the present invention, and merely schematically show cross-sectional shapes and arrangement of components by certain degree for understanding the present invention. Hence, the present invention is not limited to the illustrated examples. Also, specific conditions etc. are occasionally provided in the following description; however, the materials and conditions are merely preferred examples. Hence, the present invention is not limited to the provided examples.

Figure 1A:
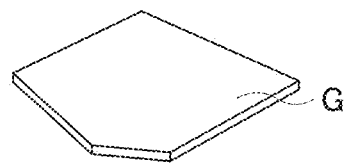
FIG. 1A A perspective view showing a plane parallel glass plate used in an embodiment of the present invention.
Figure 1B:
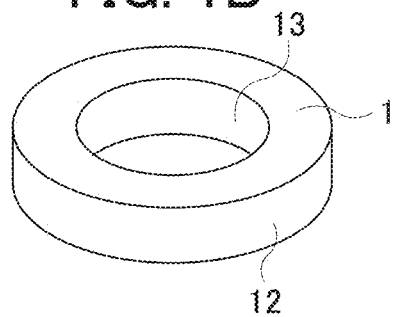
FIG. 1B is a perspective view showing a guide component used in an embodiment of the present invention.

FIGS. 1A and 1B illustrates a member that is used in a method of manufacturing a hybrid lens unit according to an embodiment of the present invention. A guide component 1 has a through hole 13 at the center, and has an outer diameter portion 12, the dimensional error of which is controlled to be 0.01 mm. A plane parallel glass plate G is formed of optical glass, and has an external shape having dimensions so that the plane parallel glass plate G is accommodated in the guide component 1 and a ray required in view of optical design can pass through the plane parallel glass plate G. The external shape does not have any limitation as long as the above-described conditions are satisfied. Further, the precision of the dimensional error of the external shape of the plane parallel glass plate G does not have any limitation as long as the above-described conditions are satisfied.

Figure 2:
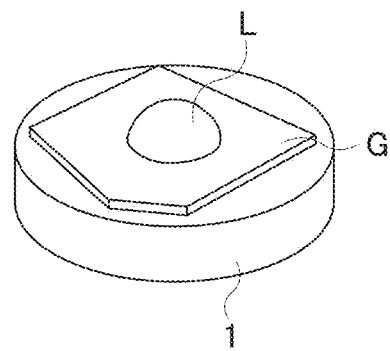
FIG. 2 A perspective view of an example of a hybrid lens unit that can be manufactured by the embodiment of the present invention.
Figure 3:
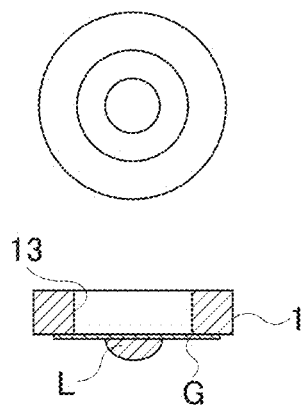
FIG. 3 A cross-sectional view of the example of the hybrid lens unit that can be manufactured by the embodiment of the present invention.

FIGS. 2 and 3 show an example of a hybrid lens unit manufactured by using the above-described members. The plane parallel glass plate G is fixed to one of surfaces of the guide component 1 by a method such as bonding. A resin lens L made of energy-curable resin is formed on one of surfaces of the plane parallel glass plate G. The glass is fixed by certain strength so that the plane parallel glass plate G is not dropped from the guide component 1 under an external environment when the lens is formed, assembled, and then becomes a product. The fixing method may be any of various methods, such as bonding with a UV adhesive or a thermosetting adhesive, welding with laser light or an ultrasonic wave, heat caulking, and press fitting.

Figure 4:
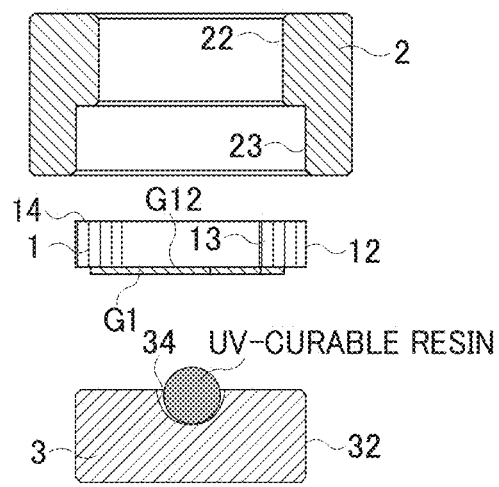
FIG. 4 A cross-sectional view of an example of a die structure for manufacturing the lens.
Figure 5:
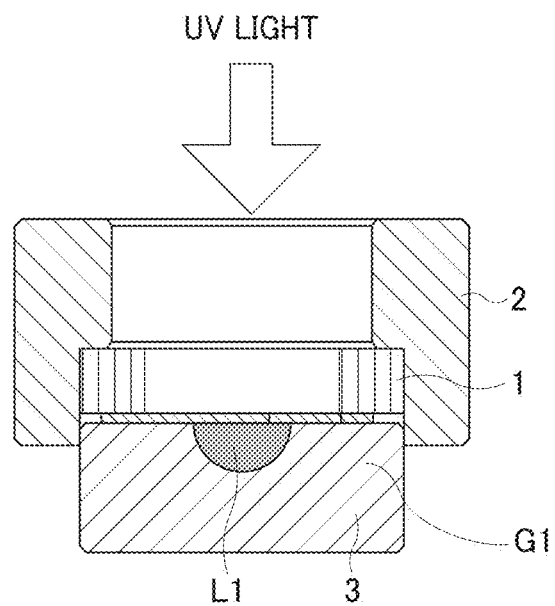
FIG. 5 A cross-sectional view when the die having the example die structure for manufacturing the lens is closed.

FIGS. 4 and 5 illustrate an example for manufacturing the above-described hybrid lens unit FIG. 4 is a cross-sectional view showing the method of manufacturing the hybrid lens unit by using the above-described members. FIG. 5 is a cross-sectional view when a die in FIG. 4 is closed. In the example in FIGS. 4 and 5, a plane parallel glass plate G1 is fixed only to one of the surfaces of the guide component 1 by an UV adhesive, and the resin lens L is formed only on one of the surfaces of the fixed plane parallel glass plate G1. The surface of the plane parallel glass plate G1 on which the resin lens L is formed is treated with silane coupling for increasing the adhesive strength at the interfaces between the glass and the resin.

If the number of plane parallel glass plates G is increased, it is assumed that numbers follow alphabets in the sequence of addition of the plane parallel glass plates G like G1, G2, G3, . . . . Also, if the number of resin lenses L is increased, it is assumed that numbers follow alphabets in the sequence of addition of the resin lenses L like L1, L2, L3, . . . .

As shown in FIGS. 4 and 5, the outer diameter portion 12 of the guide component 1 is inserted into a first inner diameter portion 23 of a holding die 2. A droplet of UV-curable resin is dropped on a lens curved surface 34 of a first lens die 3 having a spherical or aspherical shape. Then an outer diameter portion 32 is inserted into the first inner diameter portion 23 of the holding die 2, comes into contact with the plane parallel glass plate G1 while the outer diameter portion 32 pushes the UV-curable resin, and is stopped. Then, according to this embodiment, the UV-curable resin is irradiated with UV light through a second inner diameter portion 22 of the holding die 2. The UV-curable resin is cured and hence a resin lens L1 is formed on the plane parallel glass plate G1. In this embodiment, the outer diameter portion 12 of the guide component 1 is press-fitted to the first inner diameter portion 23 of the holding die 2 so that the outer diameter portion 12 is pressed by 0.01 mm or smaller. If a clearance is provided, the clearance is converted into an error of the coaxial state of the lens. However, if the error is allowable, the clearance may be provided. Further, the first inner diameter portion 23 of the holding die 2 and the outer diameter portion 32 of the first lens die 3 are processed with setting of a clearance of 0.001 mm. The die processing can have setting of such high precision of the dimensional error. In this embodiment, the first inner diameter portion 23 and the outer diameter portion 32 have straight shapes. If the clearance is not provided, the first inner diameter portion 23 and the outer diameter portion 32 may have tapered shapes. Even if the first inner diameter portion 23 and the outer diameter portion 32 have the straight shapes, the clearance may be eliminated by using an auxiliary jig such as a ball retainer.

Figure 6:
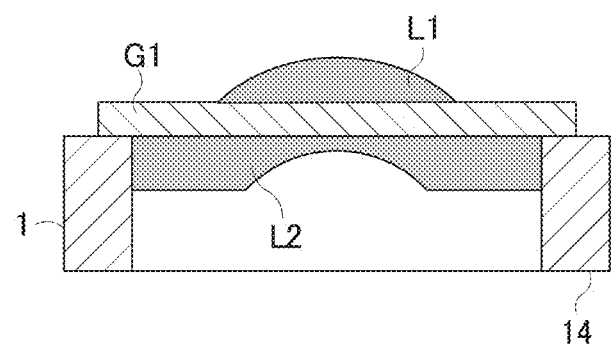
FIG. 6 A cross-sectional view of an example of a hybrid lens unit that can be manufactured by an embodiment of the present invention.
Figure 7:
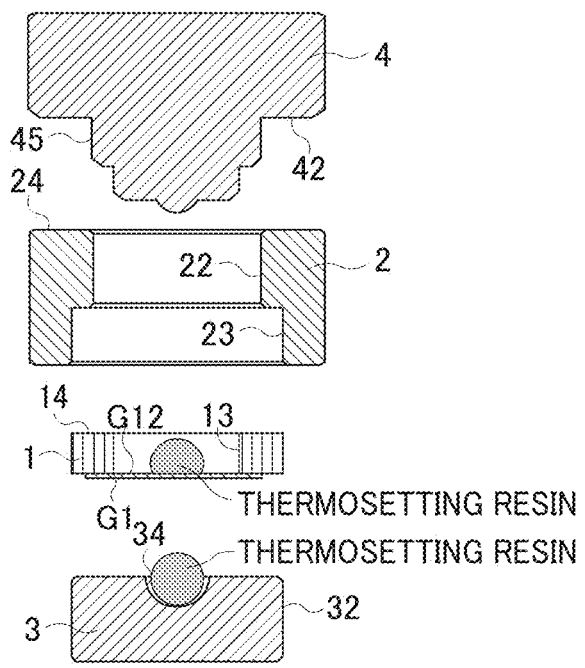
FIG. 7 A cross-sectional view of an example of a die structure for manufacturing the lens.
Figure 8:
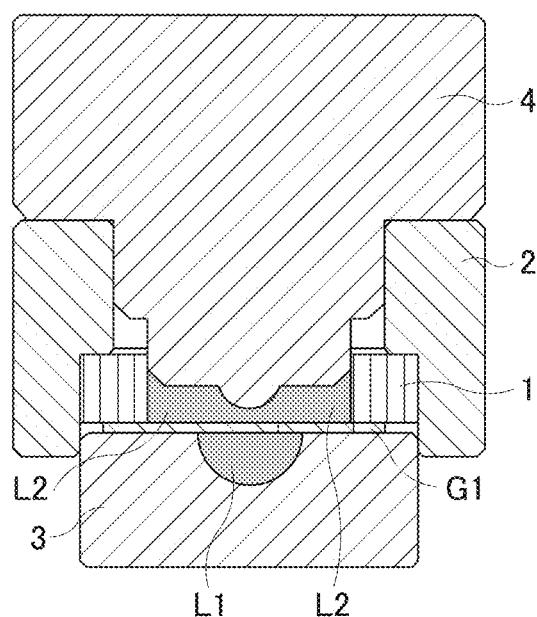
FIG. 8 A cross-sectional view when the die having the example die structure for manufacturing the lens is closed.

FIG. 6 is a cross-sectional view when the first resin lens L1 and a second resin lens L2 are formed on both surfaces of the plane parallel glass plate G1. FIGS. 7 and 8 are cross-sectional views showing an embodiment of a manufacturing method in this case. The guide component 1, to which the plane parallel glass plate G1 is fixed, is inserted into the first inner diameter portion 23 of the holding die 2. Then, a droplet of thermosetting resin is dropped on the lens curved surface 34 of the first lens die and in the through hole 13 of the guide component 1. After this work, the outer diameter portion 32 of the first lens die 3 is inserted along the first inner diameter portion 23 of the holding die 2, and comes into contact with the plane parallel glass plate G1. Hence the first lens die 3 is stopped. Then, a second outer diameter portion 45 of a second lens die 4 is inserted along the second inner diameter portion 22 of the holding die 2. A positioning step surface 42 of the second lens die 4 comes into contact with a positioning surface 24 of the holding die 2, and is stopped while the second lens die 4 pushes the thermosetting resin. Then, the die is heated to a predetermined temperature and the filled thermosetting resin is cured. The thermosetting resin is used in this embodiment; however, UV-curable resin may be used as long as UV light can pass through the resin such that the first lens die and the second lens die are alternately inserted. At this time, in order to increase the contact strength between the resin and the glass, a UV adhesive, which has good adhesion to the glass and good contact to the resin, is applied on both surfaces of the plane parallel glass plate G1 by a small thickness.

Figure 9:
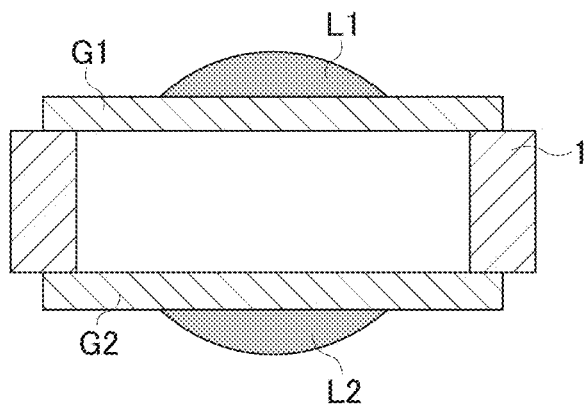
FIG. 9 A cross-sectional view of an example of a hybrid lens unit that can be manufactured by any of the embodiments of the present invention.
Figure 10:
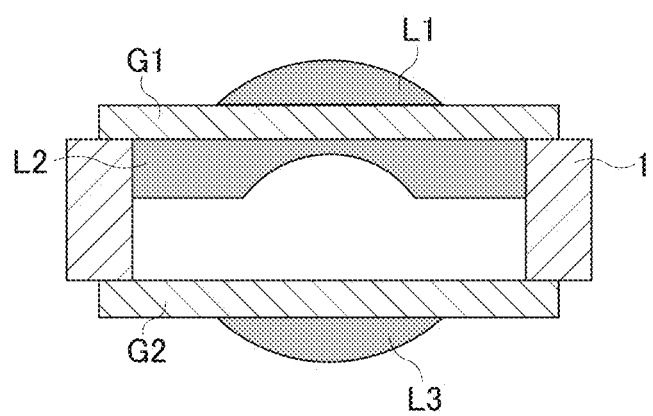
FIG. 10 A cross-sectional view of an example of a hybrid lens unit that can be manufactured by any of the embodiments of the present invention.

The embodiment explained with reference to FIGS. 6, 7, and 8 is the method of forming the resin lenses L1 formed on both surfaces of the single plane parallel glass plate G1; however, the plane parallel glass plate G1 and a plane parallel glass plate G2 as shown in FIG. 9 may be used and lenses may be formed on one of surfaces of the plane parallel glass plates G1 and G2 by a similar method. Further, as shown in FIG. 10, after the first resin lens L1 and the second resin lens L2 are formed on both surfaces of the plane parallel glass plate G1, another plane parallel glass plate G2 may be fixed to the guide component, and a third resin lens L3 may be formed on one of surfaces of the plane parallel glass plate G2. In this embodiment, the two plane parallel glass plates and the three resin lenses are provided in the single guide component.

Figure 11:
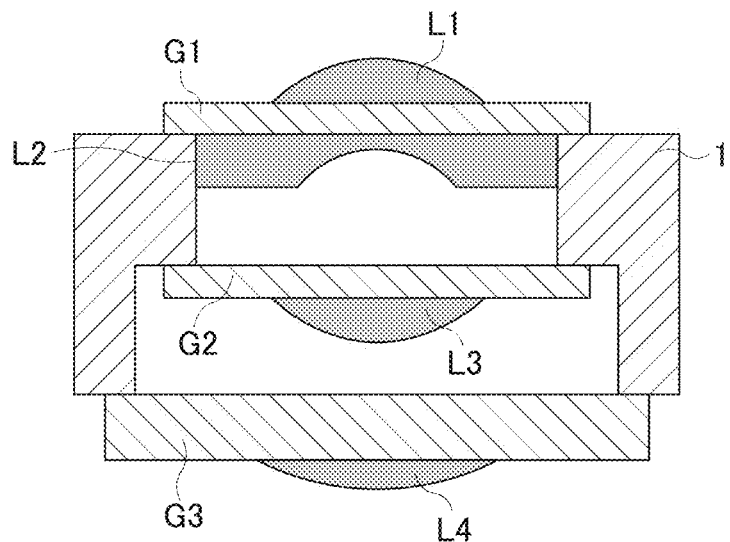
FIG. 11 A cross-sectional view of an example of a hybrid lens unit that can be manufactured by any of the embodiments of the present invention.

FIG. 11 illustrates an example in which three plane parallel glass plates G1, G2, and G3 are fixed in a single guide component, and first to fourth resin lenses L1 to L4 are formed on the plane parallel glass plates G1 to G3. By repeating the above-described method illustrated in FIG. 10, a plurality of plane parallel glass plates and a plurality of resin lenses may be formed in the single guide component with high precision. Also, with such a constitution, the lens assembly step can be omitted, and a manufacturing error during the assembly step can be eliminated. With such a constitution, a unit including a plurality of hybrid lenses can be manufactured with a low cost without the assembly step by properly arranging the plane parallel glass plates in the single guide component and forming the many resin lenses L.

Figure 12:
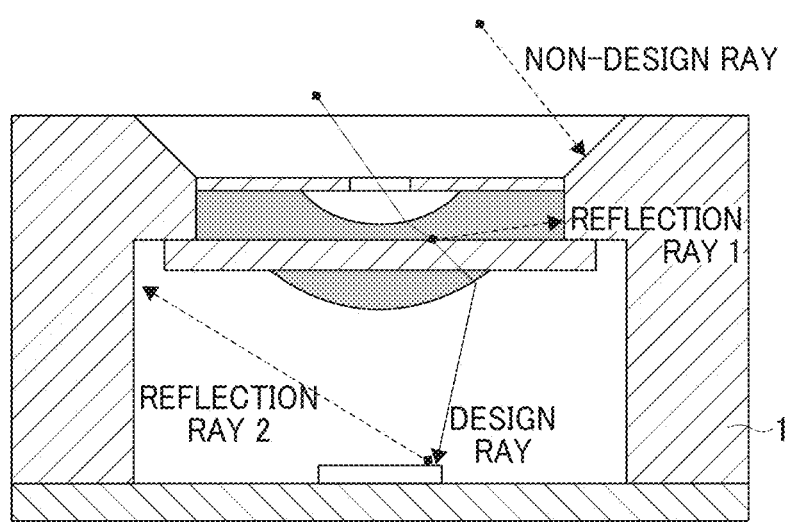
FIG. 12 A cross-sectional view for explaining a design ray, a non-design ray, and a reflection ray.

If the guide component 1 uses a material with good light-shielding performance and good antireflective performance, the guide component 1 can also have a function of a lens barrel. FIG. 12 is a cross-sectional view of a lens unit when heat resistant nylon of black grade, which is injection molding resin that is widely used for a lens barrel member of a camera module, is used. As shown in FIG. 12, if a ray other than a ray required in view of design is incident, or if a ray is incident on the guide component as the result of reflection at the lens surface, the ray is absorbed or scattered, and does not incident on a detector such as an image sensor.

Figure 13:
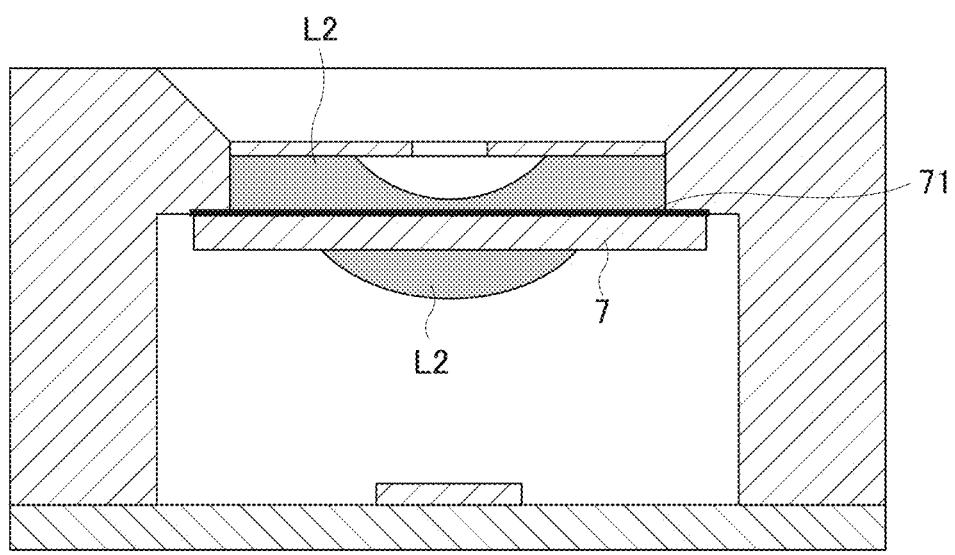
FIG. 13 A cross-sectional view for explaining application of an evaporated film to a plane parallel glass plate.

FIG. 13 is a cross-sectional view of a lens unit in which the resin lens L1 is formed on one surface 71 of a plane parallel glass plate 7 with an infrared cut coating film evaporated. In a case of a typical camera module, if a ray other than visible light is incident on an image sensor, the ray becomes a noise, and hence in many cases, a filter that is treated with processing for cutting the infrared ray is inserted to a position immediately before the image sensor. In FIG. 13, the one surface 71 of the plane parallel glass plate 7 can cut the infrared ray, an infrared cut filter is not required, the component cost can be reduced, and the assembly step can be reduced. In this embodiment, the evaporated film that reflects the infrared ray is provided as an example; however, the method and structure are not limited thereto as long as the film and structure can be formed on the glass surface.

If curved surfaces of resin lenses L are aspherical, aberration can be efficiently corrected by a small number of lenses. FIGS. 14A and 14B are tables showing design data when the first resin lens L1 and the second resin lens L2 on the plane parallel glass plate G1 having the structure according to the embodiment of the present invention are aspheric.

Figure 15A:
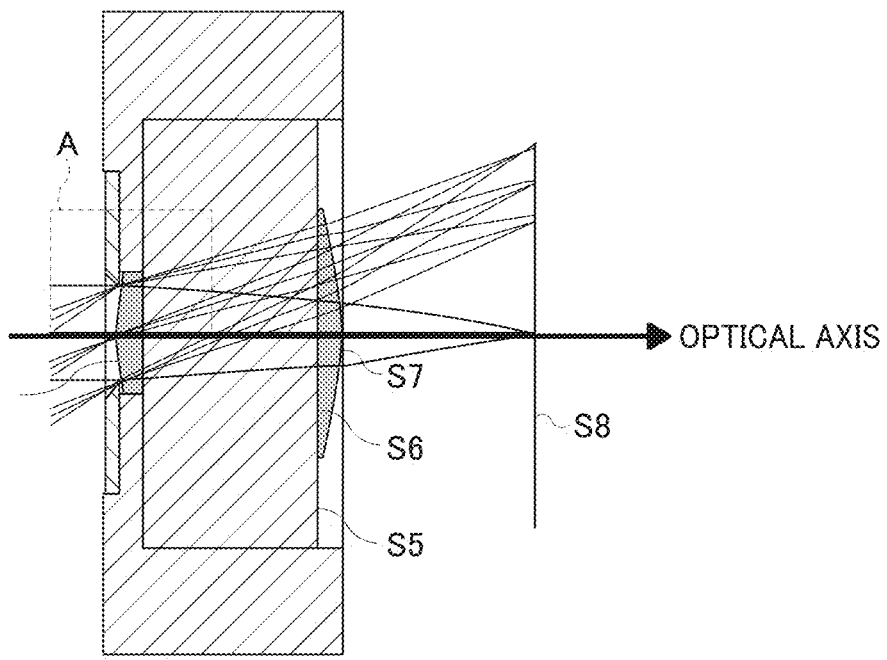
FIG. 15A A cross-sectional view of the lens unit with the optical design data in the tables in FIGS. 14A and 14B.
Figure 15B:
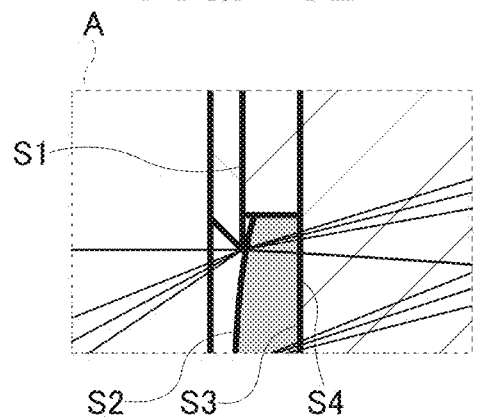
FIG. 15B An enlarged view of A portion in FIG. 15A.

Focal distance f=1.062 mm
Lens total length TL=1.525 mm
Back focus bf=0.72 mm
Sensor diagonal length IH=1.4 mm FIG. 15A is a cross-sectional view of the lens unit with the optical design data in the tables in FIGS. 14A and 14B, FIG. 15B is an enlarged view of A portion in FIG. 15A. An aperture stop plane S1 that defines an entrance pupil is arranged in front of the first resin lens L1. A line passing through the aperture stop plane S1 and the center of a focal plane S8 is the optical axis, and signs assigned such that the positive signs are provided from the aperture stop plane S1 to the focal plane S8. While the lenses are formed on both surfaces of the plane parallel glass plate G1 in this embodiment, the bonded resin and glass planes are treated as different planes. In particular, in this embodiment, a plane of the resin planoconvex lens L1 is treated as S3, and a plane of the plane parallel glass plate G1 is treated as S4. Also, a plane is expressed as a curvature radius ∞. The sign of the curvature radius is plus if the plane is convex with respect to the optical axis, and is minus if the plane is concave with respect to the optical axis. The surface spacing represents the distance between planes. The refractive index and Abbe number use numerical values based on the d-line. The focal plane contains a point at which rays passing through the lenses are condensed. A detecting device such as an image sensor is normally arranged at this position. In many cases, since the detecting device has a flat plane, the plane has the curvature radius ∞ in this embodiment. The focal distance f is a calculation value based on the d-line. The lens total length TL is a distance calculated along the optical axis from the surface S2 of the first resin lens L1 to the focal plane S8. The back focus bf is a distance calculated along the optical axis from the surface S7 of the second resin lens L2 to the focal plane S8. Mark S2 is an aspherical surface of the first resin lens, S3 is a flat surface of the first resin lens, S4 is an object side surface of the first plane parallel glass plate, S5 is an image side surface of the first plane parallel glass plate, S6 is a flat surface of the second resin lens, and S7 is an aspherical surface of the second resin lens in FIGS. 15A and 15B.

An aspherical surface used in the embodiment of the present invention is given by Expression (3) as follows:

[Math. 2]

$$Z = \frac{ch^2}{1 + \sqrt{1-(1+k)c^2h^2}} + A_0 h^4 + B_0 h^6 + C_0 h^8 + D_0 h^{10}, \quad (3)$$

where Z is a depth from a contact surface to the vertex of the surface, C is a curvature on the optical axis of a surface, h is a height from the optical axis, k is a cone constant, $A_0$ is an aspherical surface coefficient of degree 4, $B_0$ is an aspherical surface coefficient of degree 6, $C_0$ is an aspherical surface coefficient of degree 8, and $D_0$ is an aspherical surface coefficient of degree 10.

In the tables in FIGS. 14A and 14B, numerical values representing aspherical surface coefficients are indicated by exponents. For example, "E−1" represents the "−1st powder of 10."

Figure 16:
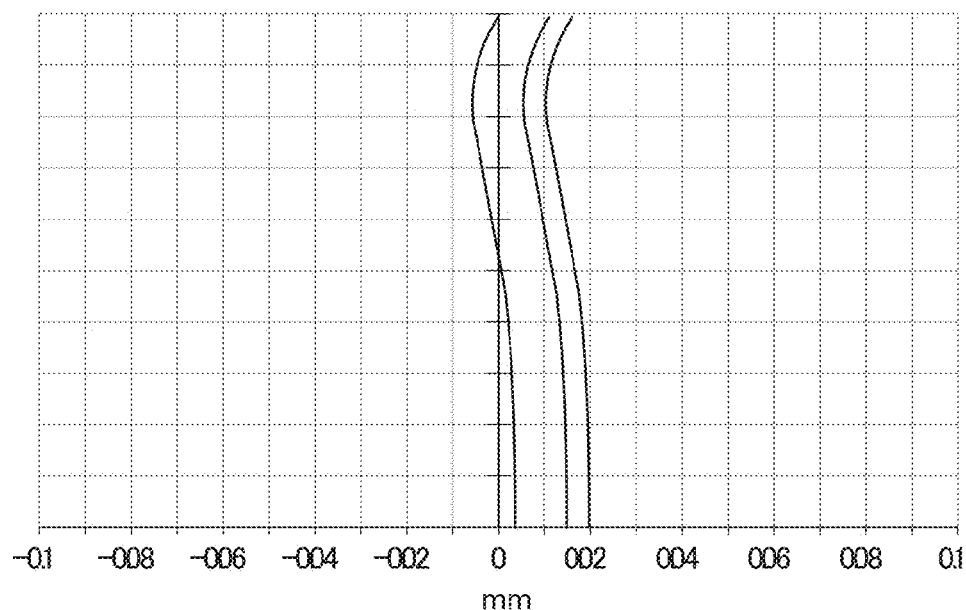
FIG. 16 A longitudinal spherical aberration diagram of the lens unit.
Figure 17:
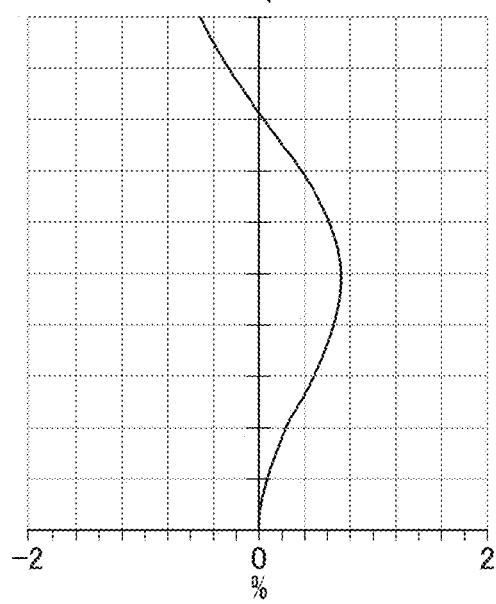
FIG. 17 A distortion aberration diagram of the lens unit.

FIG. 16 is a spherical aberration diagram and FIG. 17 is a distortion aberration diagram of the lens unit shown in the tables in FIGS. 14A and 14B. Referring to FIGS. 16 and 17, the spherical aberration is 0.1 mm or smaller, and the distortion aberration is 2% or less. Thus, it is found that good optical performance can be obtained.

Also, in the tables in FIGS. 14A and 14B, refractive indices and Abbe numbers of the plane parallel glass plate G1 and the energy-curable resin are set to satisfy the conditions of Expressions (1) and (2). With the setting, reflection at the interfaces between the glass and resin can be restricted.

As described above, if the structure and manufacturing method provided by any of the embodiments of the present invention are used, the hybrid lens unit comprising the hybrid lens having the hybrid structure including the glass and the resin, and the guide component can be manufactured with a low cost, high precision of a dimensional error and easiness of assembly.

REFERENCE SIGNS LIST

1 Guide component
12 Outer diameter portion of guide component
13 Through hole of guide component
14 Bottom surface of guide component
2 Holding die
22 Second inner diameter portion of holding die
23 First inner diameter portion of holding die
24 Positioning surface of holding die
3 First lens die
32 Outer diameter of first lens die
34 Lens curved surface of first lens die
4 Second lens die
42 Positioning step surface of second lens die
45 Second outer diameter portion of second lens die
7 Plane parallel glass plate with infrared cut evaporated coating film
71 Infrared cut evaporated coating film
G Plane parallel glass plate
G1 First plane parallel glass plate
G2 Second plane parallel glass plate
G3 Third plane parallel glass plate
L Resin lens
L1 First resin lens
L2 Second resin lens
L3 Third resin lens
L4 Fourth resin lens
S1 Aperture stop plane
S2 Aspherical surface of first resin lens
S3 Flat surface of first resin lens
S4 Object side surface of first plane parallel glass plate
S5 Image side surface of first plane parallel glass plate
S6 Flat surface of second resin lens
S7 Aspherical surface of second resin lens
S8 Focal plane

The invention claimed is:

1. A method of manufacturing a hybrid lens unit comprising a hybrid lens and a guide component, comprising the following steps of;
   (a) preparing a guide component having a through hole, and a plane parallel glass plate formed of optical glass;
   (b) fixing the plane parallel glass plate to at least one of surface of the guide component so that the plane parallel glass plate is permanently accommodated in the guide component;
and then
   (c) forming a resin lens on at least one of surfaces of the plane parallel glass plate by applying and curing energy-curable resin.

2. The method of manufacturing the hybrid lens unit according to claim 1, wherein the guide component is formed of an elastic member having light-shielding performances such that a transparency is 1% or less and a surface reflectivity is 5% or less for a ray with a predetermined wavelength.

3. The method of manufacturing the hybrid lens unit according to claim 1, wherein at least one of the surfaces of the plane parallel glass plate is treated with coating processing so that the transparency is 20% or less for a ray with a predetermined wavelength.

4. The method of manufacturing the hybrid lens unit according to claim 1, wherein at least one of the surfaces of the plane parallel glass plate is treated with antireflection processing so that the transparency is 80% or more for a ray with a predetermined wavelength.

5. The method of manufacturing the hybrid lens unit according to claim 1, wherein the resin lens formed of the energy-curable resin has a curved surface having an aspherical surface shape.

6. The method of manufacturing the hybrid lens unit according to claim 1, wherein refractive indices and Abbe numbers of the plane parallel glass plate and the energy-curable resin satisfy Expressions (1) and (2) as follows, $$0 \leq |Ng - Nr| \leq 0.1 \quad (1), \text{ and}$$

$$0 \leq |vg - vr| \leq 30 \quad (2),$$

where Ng is a refractive index based on the d-line of the plane parallel glass plate for a ray with a predetermined wavelength, Nr is a refractive index based on the d-line of the energy-curable resin, vg is an Abbe number based on the d-line of the plane parallel glass plate, and γr is an Abbe number based on the d-line of the energy-curable resin.

* * * * *